US011972750B2

(12) United States Patent
Oosugi et al.

(10) Patent No.: US 11,972,750 B2
(45) **Date of Patent: *Apr. 30, 2024**

(54) VOICE OUTPUT APPARATUS, VOICE OUTPUT METHOD, AND VOICE OUTPUT PROGRAM

(71) Applicants: NEC Corporation, Tokyo (JP); NEC Platforms, Ltd., Kawasaki (JP)

(72) Inventors: Kouji Oosugi, Tokyo (JP); Ryoji Miyahara, Kanagawa (JP)

(73) Assignees: NEC CORPORATION, Tokyo (JP); NEC Platforms, Ltd., Kanagawa (JP)

(*) Notice: Subject to any disclaimer, the term of this patent is extended or adjusted under 35 U.S.C. 154(b) by 293 days.

This patent is subject to a terminal disclaimer.

(21) Appl. No.: 17/440,340

(22) PCT Filed: Mar. 26, 2020

(86) PCT No.: PCT/JP2020/013850
§ 371 (c)(1),
(2) Date: Sep. 17, 2021

(87) PCT Pub. No.: WO2020/196796
PCT Pub. Date: Oct. 1, 2020

(65) Prior Publication Data

US 2022/0189448 A1 Jun. 16, 2022

(30) Foreign Application Priority Data

Mar. 27, 2019 (JP) ................................ 2019-061289

(51) Int. Cl.
*G10K 11/178* (2006.01)
*H04R 1/10* (2006.01)
(Continued)

(52) U.S. Cl.
CPC .. *G10K 11/17854* (2018.01); *G10K 11/17885* (2018.01); *H04R 1/1016* (2013.01);
(Continued)

(58) Field of Classification Search
None
See application file for complete search history.

(56) References Cited

U.S. PATENT DOCUMENTS 10,839,786 B1 * 11/2020 Hera ........................ H04R 5/04
2007/0274535 A1 11/2007 Mao
(Continued)

FOREIGN PATENT DOCUMENTS

CN 107889007 A 4/2018
CN 108429950 A * 8/2018 ........... H04R 1/1083
(Continued)

OTHER PUBLICATIONS

International Search Report for PCT Application No. PCT/JP2020/013850, dated May 19, 2020.
(Continued)

*Primary Examiner* — Qin Zhu

(57) ABSTRACT

There is provided a voice output apparatus for providing a high-quality sound to an eardrum of a user. The voice output apparatus includes a first voice output unit outputting a voice to an ear canal of a user based on an output voice signal, a first noise acquirer arranged to face outward from a body of the user and captures a mixed voice including first external noise arriving from an outside of the user to output a mixed voice signal, an echo canceler cancelling an influence, on the first external noise, of a leaked voice output from the first voice output unit and leaking to the outside of the user, and a noise canceler generating a first external noise signal corresponding to the first external noise, and processing,
(Continued)

using the first external noise signal, an input voice signal input from the outside to generate the output voice signal.

15 Claims, 12 Drawing Sheets

(51) Int. Cl.
*H04R 3/02* (2006.01)
*H04R 5/033* (2006.01)
*H04R 5/04* (2006.01)

(52) U.S. Cl.
CPC ........... *H04R 1/1083* (2013.01); *H04R 5/033* (2013.01); *H04R 5/04* (2013.01)

(56) References Cited

U.S. PATENT DOCUMENTS

| | | | | |
|---|---|---|---|---|
| 2011/0293103 | A1* | 12/2011 | Park | G10K 11/17854 381/57 |
| 2012/0250852 | A1* | 10/2012 | Rowley | H04M 9/082 379/406.01 |
| 2014/0307884 | A1 | 10/2014 | Asada et al. | |
| 2015/0023515 | A1 | 1/2015 | Reimert | |
| 2015/0104031 | A1 | 4/2015 | Park et al. | |
| 2019/0130930 | A1* | 5/2019 | Tong | G10L 21/0208 |
| 2021/0392445 | A1* | 12/2021 | Oosugi | H04R 25/603 |
| 2022/0223133 | A1* | 7/2022 | Mccutcheon | G10K 11/17813 |

FOREIGN PATENT DOCUMENTS

| | | | | |
|---|---|---|---|---|
| JP | H06-014101 | A | 1/1994 | |
| JP | H07-240989 | A | 9/1995 | |
| JP | H09-093684 | A | 4/1997 | |
| JP | 2955855 | B1 | 10/1999 | |
| JP | 2013-121105 | A | 6/2013 | |
| JP | 2014-197826 | A | 10/2014 | |
| JP | 2015-2450 | A | 1/2015 | |
| JP | 2016-536946 | A | 11/2016 | |
| JP | 2018-137735 | A | 8/2018 | |
| WO | WO-2018229503 | A1 * | 12/2018 | G10L 21/0208 |

OTHER PUBLICATIONS

English translation of Written opinion for PCT Application No. PCT/JP2020/013850, dated May 19, 2020.
Japanese Office Action for JP Application No. 2019-061289 dated Jun. 2, 2020 with English Translation.
Japanese Office Action for JP Application No. 2019-061289 dated Dec. 8, 2020 with English Translation.
Partial Supplementary European Search Report for EP Application No. EP20778243.4 dated Apr. 29, 2022.
Japanese Office Action for JP Application No. 2020-215318 dated Nov. 30, 2021 with English Translation.

* cited by examiner

VOICE OUTPUT APPARATUS, VOICE OUTPUT METHOD, AND VOICE OUTPUT PROGRAM

This application is a National Stage Entry of PCT/JP2020/013850 filed on Mar. 26, 2020, which claims priority from Japanese Patent Application 2019-061289 filed on Mar. 27, 2019, the contents of all of which are incorporated herein by reference, in their entirety.

TECHNICAL FIELD

The disclosure relates to a voice output apparatus, a voice output method, and a voice output program.

BACKGROUND ART

In the above technical field, patent literature 1 discloses a technique of detecting, by a microphone incorporated in an ear pad provided in a ring shape in a temporal region of a user, an external sound signal and a reproduced sound signal, generating a cancel signal by inverting the phases of the detected external sound signal and the detected reproduced sound signal, and reproducing the generated cancel signal as a cancel sound from the second driver unit.

CITATION LIST

Patent Literature

Patent literature 1: Japanese Patent Laid-Open No. 2015-2450

SUMMARY OF THE INVENTION

Technical Problem

However, the technique described in the above literature assumes that there exists a ring-shaped ear pad contacting the temporal region of the user, and can thus be applied to only some headphones.

The disclosure provides a technique of solving the above-described problem.

Solution to Problem

To achieve the above object, according to the disclosure, there is provided a voice output apparatus comprising:

a first voice output unit that outputs a voice to an ear canal of a user based on an output voice signal;

a first noise acquirer that is arranged to face outward from a body of the user and captures a mixed voice including first external noise arriving from an outside of the user to output a mixed voice signal;

an echo canceler that cancels an influence, on the first external noise, of a leaked voice output from the first voice output unit and leaking to the outside of the user; and a noise canceler that generates a first external noise signal corresponding to the first external noise, and processes, using the first external noise signal, an input voice signal input from the outside to generate the output voice signal.

To achieve the above object, according to the disclosure, there is provided a voice output method comprising:

outputting a voice to an ear canal of a user based on an output voice signal;

capturing a mixed voice including external noise arriving from an outside of the user to output a mixed voice signal;

canceling an influence, on the external noise, of a leaked voice output in the outputting and leaking to the outside of the user; and generating a external noise signal corresponding to the external noise, and processing, using the external noise signal, an input voice signal input from the outside to generate the output voice signal.

To achieve the above object, according to the disclosure, there is provided a voice output program for causing a computer to execute a method, comprising:

outputting a voice to an ear canal of a user based on an output voice signal;

capturing a mixed voice including external noise arriving from an outside of the user to output a mixed voice signal;

canceling an influence, on the external noise, of a leaked voice output in the outputting and leaking to the outside of the user; and generating a external noise signal corresponding to the external noise, and processing, using the external noise signal, an input voice signal input from the outside to generate the output voice signal.

ADVANTAGEOUS EFFECTS OF INVENTION

According to the disclosure, voice output apparatuses of various forms can provide a high-quality sound to the eardrum of a user.

DESCRIPTION OF EXAMPLE EMBODIMENTS

Figure 1:
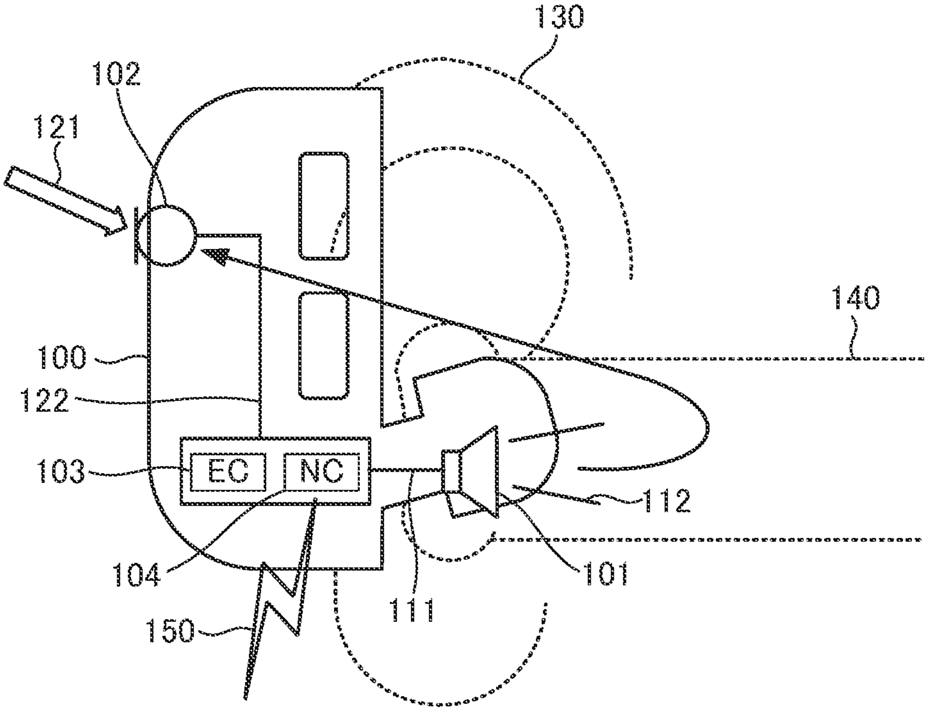
FIG. 1 is a view showing the arrangement of a voice output apparatus according to the first example embodiment of the disclosure.

Example embodiments of the disclosure will now be described in detail with reference to the drawings. It should be noted that the relative arrangement of the components, the numerical expressions and numerical values set forth in these example embodiments do not limit the scope of the disclosure unless it is specifically stated otherwise. Further, in the drawings below, a unidirectional arrow simply indicates the flow direction of a given signal, and does not exclude bidirectionality. Note that the term “voice signal” in the following description refers to a direct electrical change which is generated in accordance with a voice or another sound and used to transmit the voice or the other sound, so this is not limited to a voice.

First Example Embodiment

A voice output apparatus 100 according to the first example embodiment of the disclosure will be described with reference to FIG. 1. As shown in FIG. 1, the voice output apparatus 100 includes a voice output unit 101, a noise acquirer 102, an echo canceler 103, and a noise canceler 104. The voice output unit 101 outputs a voice 112 to an ear canal 140 of a user 130 based on an output voice signal 111. The noise acquirer 102 is arranged to face outward from the body of the user 130, and captures a mixed voice including external noise 121 arriving from the outside of the user 130 to output a mixed voice signal 122. The echo canceler 103 cancels the influence, on the external noise 121, of a leaked voice output from the voice output unit 101 and leaking to the outside of the user 130. The noise canceler 104 generates a first external noise signal corresponding to the external noise 121, and processes, using the first external noise signal, an input voice signal input from the outside to generate the output voice signal 111.

According to this example embodiment, voice output apparatuses of various forms can provide a sound intended by a producer to the eardrum of the user while performing noise cancellation.

Second Example Embodiment

Figure 2A:
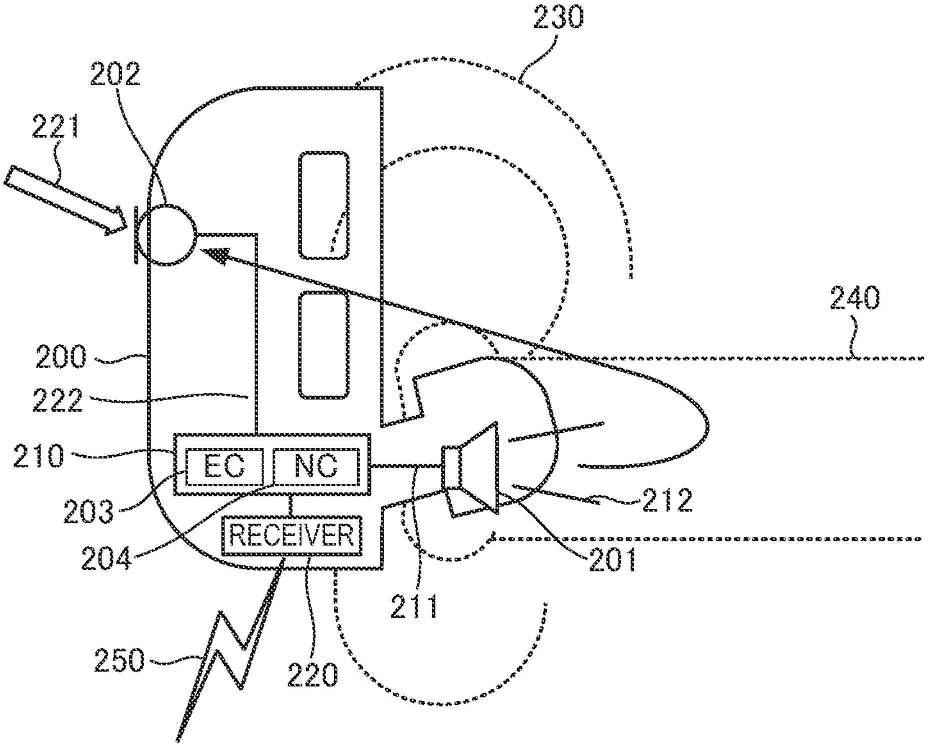
FIG. 2A is a view showing the arrangement of a voice output apparatus according to the second example embodiment of the disclosure.

A voice output apparatus according to the second example embodiment of the disclosure will be described next with reference to FIGS. 2A and 2B. FIG. 2A is a view showing the arrangement of the voice output apparatus according to this example embodiment. A voice output apparatus 200 includes a loudspeaker 201 as a voice output unit, an external microphone 202 as a noise acquirer, a voice processor 210, and a receiver 220. The voice processor 210 includes an echo canceler 203 and a noise canceler 204. The voice output apparatus 200 may be an inner ear headphone, a canal headphone, a two-ear headphone, a single-ear headphone, or a monaural headphone but the disclosure is not limited to them. The voice output apparatus 200 is not limited to a headphone, and may be an earphone or a headset.

The receiver 220 receives a transmission signal 250 via wireless or wired communication from a voice reproduction apparatus such as a smartphone. The transmission signal 250 received by the receiver 220 undergoes processing in the voice processor 210 to be converted into an output voice signal 211, and the output voice signal 211 is input to the loudspeaker 201. The loudspeaker 201 accepts the input of the output voice signal 211, and outputs an output voice 212 to an ear canal 240 of a user 230.

The external microphone 202 is arranged to face outward from the body of the user 230, and captures external noise 221 arriving from the outside of the user 230. However, when the loudspeaker 201 outputs a voice, the external microphone 202 may capture the output voice 212 as sound leakage. In this case, the external microphone 202 captures a mixed voice in which the external noise 221 and the output voice 212 are mixed, and outputs a mixed voice signal 222.

The echo canceler 203 processes the mixed voice signal 222 using the output voice signal 211 to generate a pseudo external noise signal.

The noise canceler 204 processes the transmission signal 250 using the pseudo external noise signal to generate the output voice signal 211.

Figure 2B:
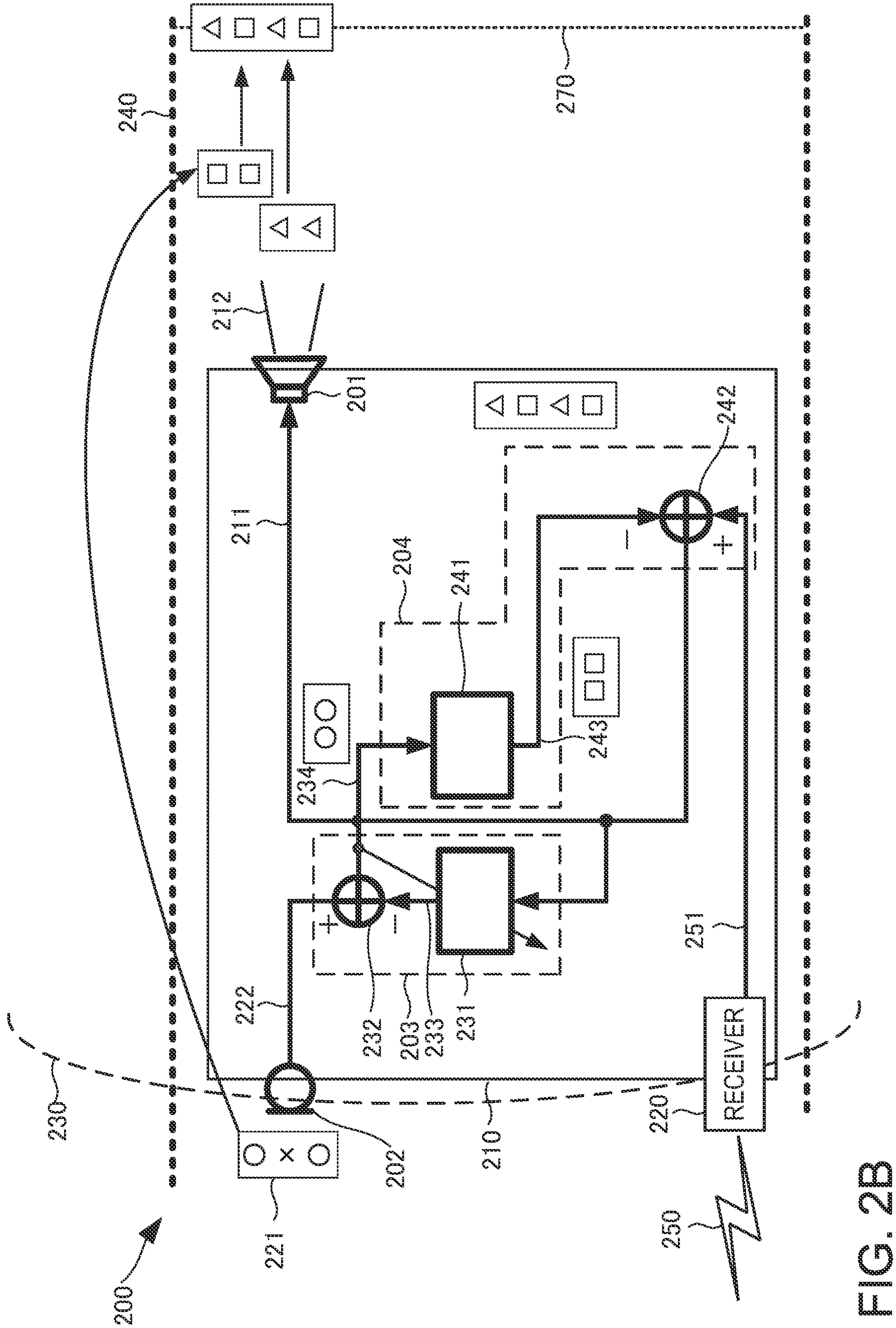
FIG. 2B is a view showing the detailed arrangement of a voice processor of the voice output apparatus according to the second example embodiment of the disclosure.

FIG. 2B is a view showing the detailed arrangement of the voice processor 210 of the voice output apparatus 200 according to this example embodiment. The mixed voice signal 222 generated by the external microphone 202 is input to the echo canceler 203. The echo canceler 203 applies echo cancellation processing to the mixed voice signal 222 using the output voice signal 211. The echo canceler 203 includes an adaptive filter 231 and an adder 232. The adaptive filter 231 generates a pseudo output voice signal 233 using the output voice signal 211. The adder 232 subtracts the pseudo output voice signal 233 from the mixed voice signal 222 to generate a pseudo external noise signal 234. The pseudo external noise signal 234 output from the adder 232 is used to update the coefficient of the adaptive filter 231.

The noise canceler 204 includes a fixed filter 241 and an adder 242. The pseudo external noise signal 234 is input to the noise canceler 204. The noise canceler 204 uses the input pseudo external noise signal 234 to process an input voice signal 251 generated based on the transmission signal 250. The noise canceler 204 drives the fixed filter 241 to generate a pseudo external noise signal 243 of a voice signal included in the mixed voice signal 222. The adder 242 subtracts the pseudo external noise signal 243 from the input voice signal 251.

The above-described contents will be explained by, for example, representing the input voice signal 251 as [Δ□Δ□] and the external noise 221 as [○x○]. The echo canceler 203 processes the external noise 221 [○x○] to generate a signal [○○] as the pseudo external noise signal 234. The noise canceler 204 generates the pseudo external noise signal 243 [□□] using the pseudo external noise signal 234 [○○], and subtracts the pseudo external noise signal 243 [□□] from the input voice signal 251 [Δ□Δ□] to obtain the output voice signal 211, and thus the loudspeaker 201 outputs an output voice [ΔΔ]. Furthermore, the external noise 221 [○x○] is deformed into [□□] before arriving at the ear canal 240 via the head of the user 230. Then, the same signal [Δ□Δ□] as the input voice signal 251, which is obtained by a combination of [ΔΔ] output from the loudspeaker 201 and the deformed external noise [□□], arrives at an eardrum 270 of the user 230.

According to this example embodiment, it is possible to eliminate the influence that sound leakage output from the loudspeaker is mixed in the external microphone, thereby providing a high-quality sound to the eardrum of the user.

Third Example Embodiment

Figure 3A:
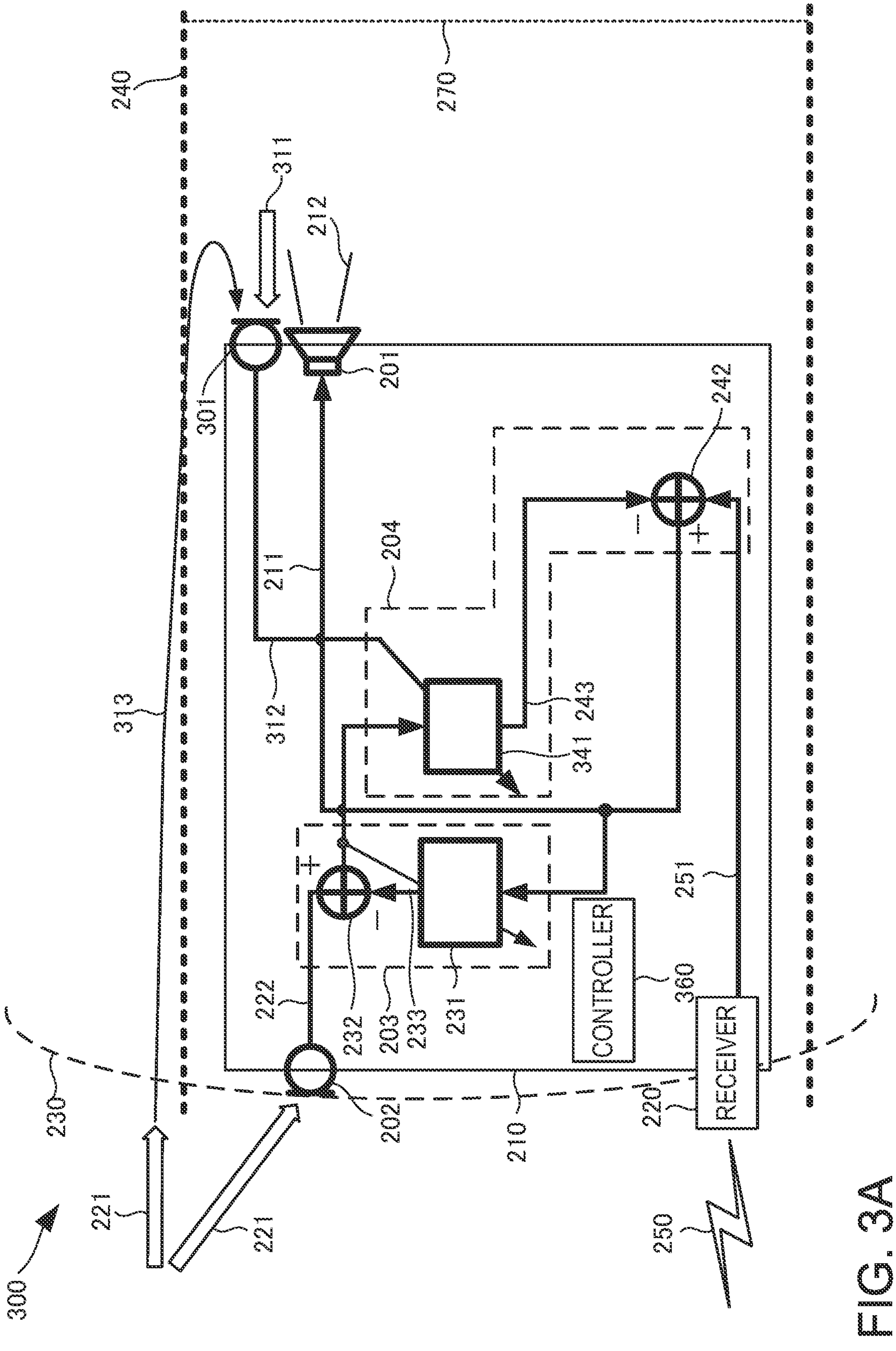
FIG. 3A is a view showing the detailed arrangement of a voice processor of a voice output apparatus according to the third example embodiment of the disclosure.

A voice output apparatus according to the third example embodiment of the disclosure will be described next with reference to FIGS. 3A and 3B. FIG. 3A is a view showing the detailed arrangement of a voice processor of the voice output apparatus according to this example embodiment. The voice output apparatus according to this example embodiment is different from that according to the above-described second example embodiment in that an internal microphone 301 and a controller 360 are provided and the fixed filter 241 is replaced by an adaptive filter 341. The remaining components and operations are similar to those in the second example embodiment. Hence, the same reference numerals denote similar components and operations, and a detailed description thereof will be omitted.

The internal microphone 301 is an internal microphone arranged to face an ear canal 240 of a user 230. The internal microphone 301 captures external noise 313 obtained when part of external noise 221 spatially passes through the voice output apparatus and is transmitted to the ear canal 240. The external noise 313 captured by the internal microphone 301 is used as an error signal 312 to update the coefficient of the adaptive filter 341. A noise canceler 204 processes an input voice signal 251 using an input pseudo external noise signal 234.

The controller 360 controls the update timing of the coefficients of the adaptive filter 341 and an adaptive filter 231.

Figure 3B:
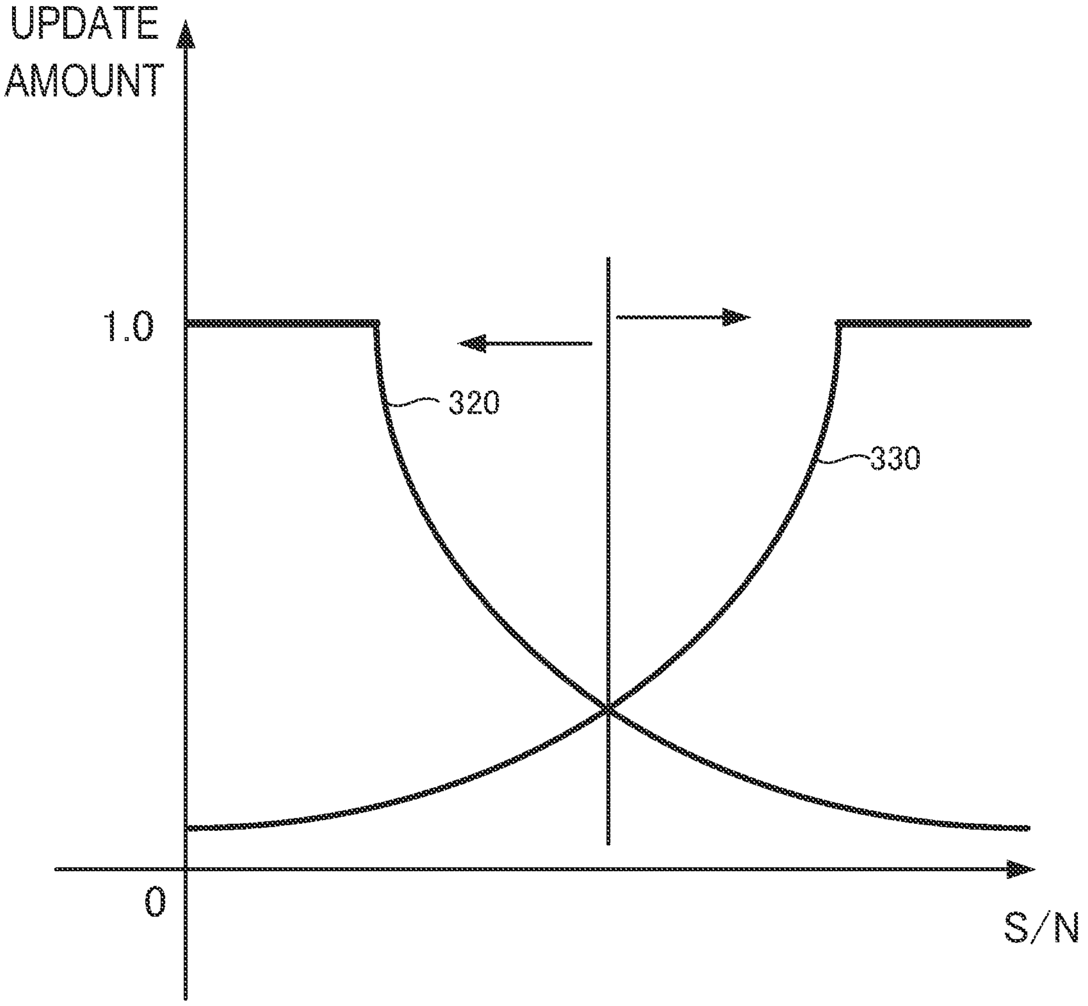
FIG. 3B is a graph for explaining the coefficient processing of a controller of the voice output apparatus according to the third example embodiment of the disclosure.
Figure 3C:
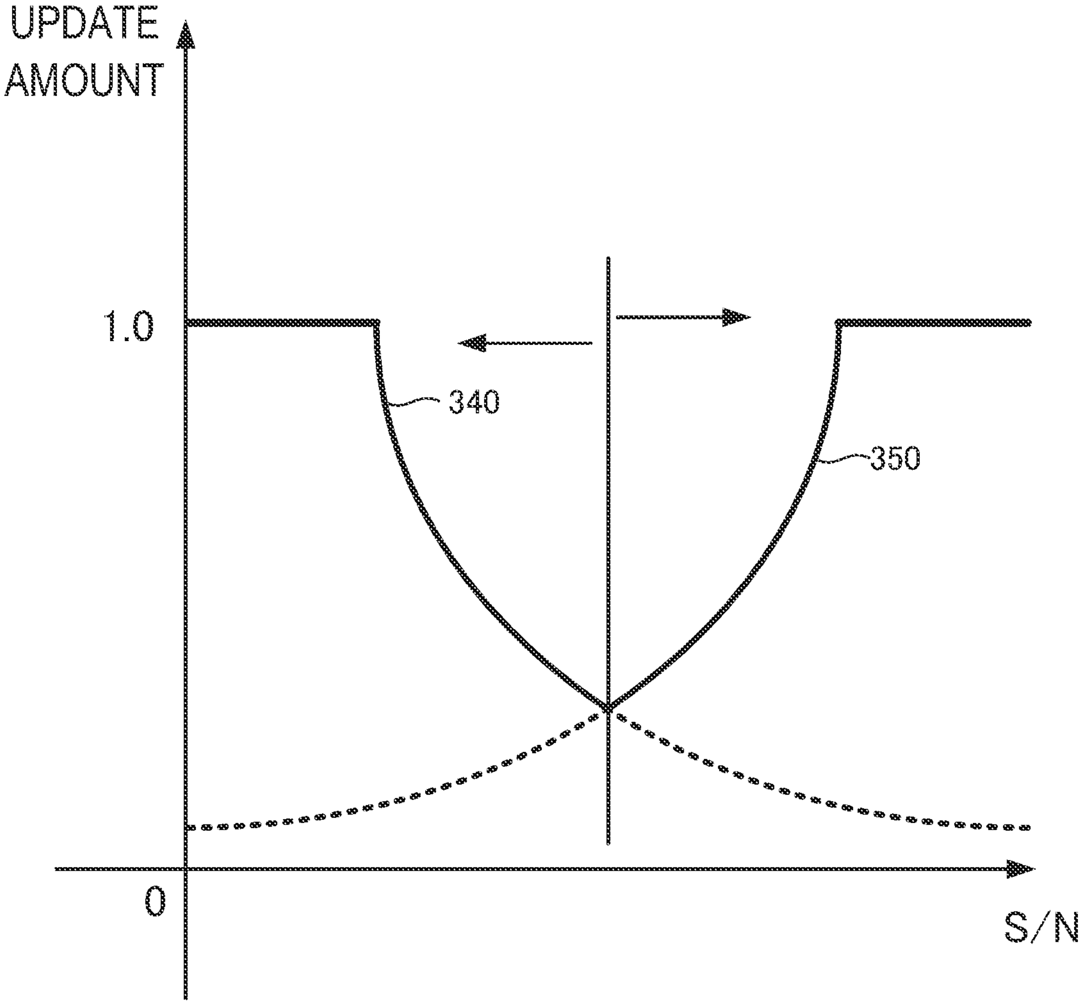
FIG. 3C is a graph for explaining the coefficient processing of the controller of the voice output apparatus according to the third example embodiment of the disclosure.

FIG. 3B is a graph for explaining the coefficient processing of the controller of the voice output apparatus according to this example embodiment. As described above, an echo canceler 203 and a noise canceler 204 perform echo cancellation processing and noise cancellation processing using the adaptive filters 231 and 341, respectively. In FIG. 3B, the ordinate represents an update amount (learning amount) and the abscissa represents an S/N (Signal-to-Noise ratio). A graph 320 indicates the update amount of the coefficient of the adaptive filter 341 of the noise canceler 204. A graph 330 indicates the update amount of the coefficient of the adaptive filter 231 of the echo canceler 203. As indicated by graphs 320 and 330, the controller 360 simultaneously performs filter update for the adaptive filters 231 and 341 while changing the update amount by the S/N ratio. Furthermore, as indicated by graphs 340 and 350 in FIG. 3C, the controller 360 can accelerate filter convergence by stopping filter update of the adaptive filter, whose update amount is smaller, based on the S/N ratio and the update curve. Instead of turning on/off the echo canceler 203 and the noise canceler 204, update (learning) of each of adaptive filters 231 and 341 is turned on/off, thereby alternately updating the adaptive filters 231 and 341. After the adaptive filters 231 and 341 are updated to some extent, each filter coefficient hardly changes. In this state, the controller 360 does not reupdate the adaptive filters 231 and 341 in principle but if the device is detached or the device is passed to another user while the power is ON, the controller 360 performs filter update to adopt the device to the other user.

The timing when the controller 360 updates the adaptive filter 341 is the timing when the internal microphone 301 does not capture an output voice 212. Furthermore, the timing when the controller 360 updates the adaptive filter 231 is the timing when a loudspeaker 201 outputs the output voice 212.

Furthermore, the internal microphone 301 may capture a main voice 311 of the user 230 transmitted through the ear canal from the vocal cord of the user 230 in addition to the external noise 313, thereby generating a main voice signal. At the timing when the main voice 311 is captured and the loudspeaker 201 outputs an output voice, the adaptive filter 231 is not updated.

According to this example embodiment, it is possible to eliminate the influence that sound leakage output from the loudspeaker is mixed in the external microphone, and provide a sound intended by a producer to the eardrum of the user while performing noise cancellation. Since the adaptive filters are updated, it is possible to deal with a change in external noise and a change in voice output from the loudspeaker.

Fourth Example Embodiment

Figure 5A:
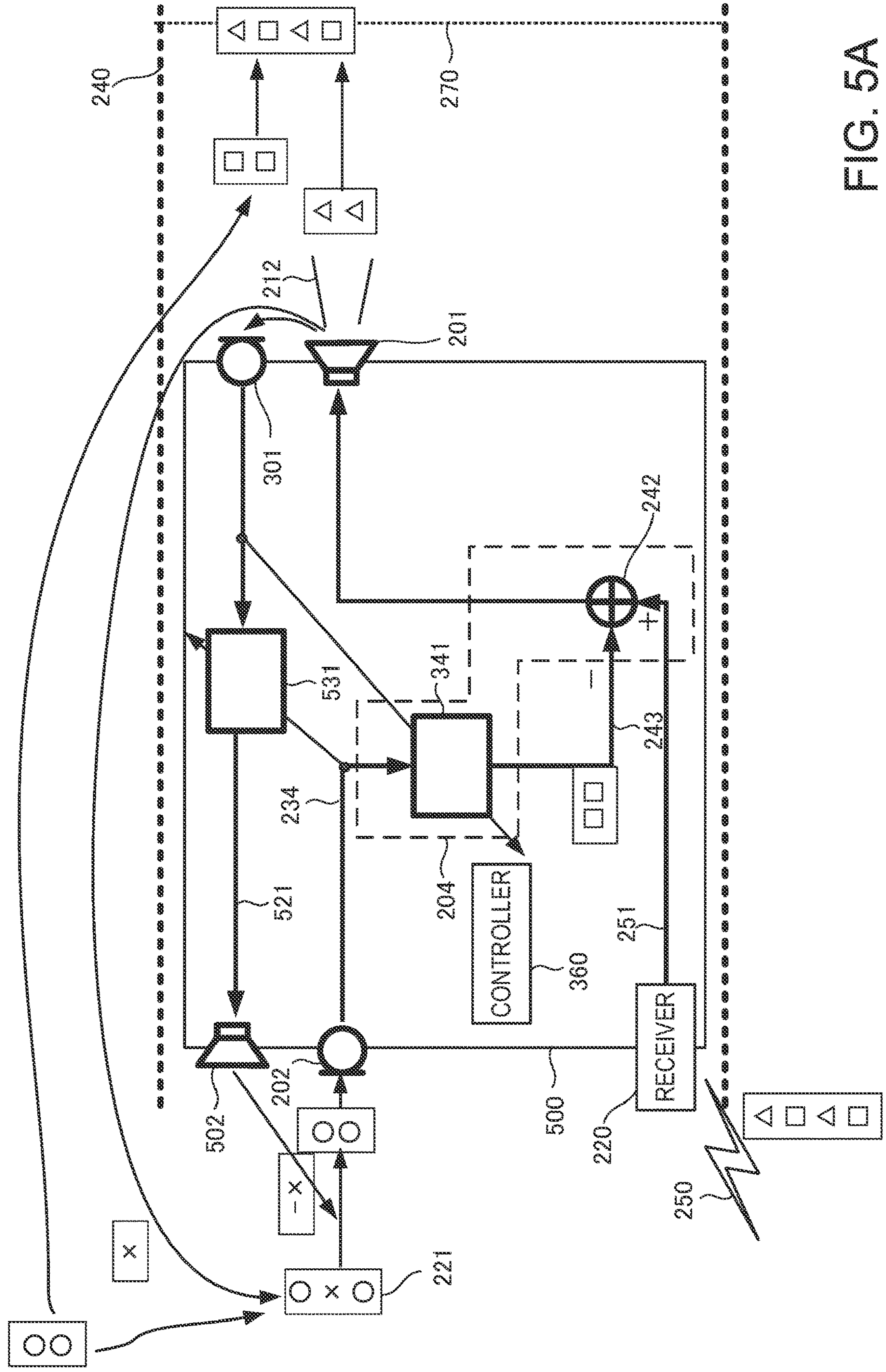
FIG. 5A is a view showing the arrangement of a voice output apparatus according to the fourth example embodiment of the disclosure.

A voice output apparatus according to the fourth example embodiment of the disclosure will be described next with reference to FIG. 5A. FIG. 5A is a view showing the detailed arrangement of a voice processor of the voice output apparatus according to this example embodiment. The voice output apparatus according to this example embodiment is different from that according to the above-described third example embodiment in that a loudspeaker 502 is further provided. The remaining components and operations are similar to those in the second example embodiment. Hence, the same reference numerals denote similar components and operations, and a detailed description thereof will be omitted.

A voice output apparatus 500 includes the loudspeaker 502. That is, the voice output apparatus 500 has a structure including two microphones and two loudspeakers in an ear canal 240 of a user 230. An external microphone 202 and the loudspeaker 502 are made to face outward from the user 230.

The loudspeaker 502 is a loudspeaker made to face outward from the user 230. By outputting an opposite-phase voice signal 521 ("−X") having a phase opposite to that of sound leakage "X" from the loudspeaker 502, the sound leakage "X" is controlled in advance in the outer space of the user 230 (active noise control). Then, by controlling the sound leakage "X", the external microphone 202 captures high-quality external noise 221 which the sound leakage hardly influences.

An internal microphone 301 captures part of an output voice 212 output from the loudspeaker 201, and an adaptive filter 531 generates the opposite-phase voice signal 521 corresponding to the part of the output voice 212 captured by the internal microphone 301. The loudspeaker 502 outputs an opposite-phase voice based on the opposite-phase voice signal 521.

The update amount of an adaptive filter 341 is large when the difference between a pseudo external noise signal 234 and the output voice 212 is sufficiently small. That is, the difference between the pseudo external noise signal 234 and the output voice 212 represents detailed information of an environmental change, and is an S/N ratio (Signal-to-Noise Ratio). It is considered that when the difference approaches 0 (lim→0), the S/N ratio approaches infinite (lim→∞). The update amount of the adaptive filter 531 is large when the output voice 212 captured by the internal microphone 301 is sufficiently large. That is, this is because in the adaptive filter 531, it is considered that when the output voice 212 captured by the internal microphone 301 is sufficiently large, the S/N ratio approaches infinite (lim→∞). A case in which the output voice 212 captured by the internal microphone 301 is large corresponds to a case in which a transmission signal 250 is received and the user utters.

According to this example embodiment, since it is possible to extract a high-quality pseudo external noise signal, it is possible to improve the quality of a sound that arrives at the eardrum of the user. Furthermore, since the opposite-phase sound is output from the loudspeaker, it is possible to reduce sound leakage to the periphery. That is, in this example embodiment, the ear canal 240 of the user 230 is regarded as a one-dimensional acoustic tube, and the external microphone 202 and the loudspeaker 502 are arranged at the end of the ear canal 240, thereby making it possible to prevent sound leakage. When a pipe is exemplified as a one-dimensional acoustic tube, a sound radially spreads but the sound travels straight in the pipe without radially spreading. Even if one point of the radially spreading sound is captured and a sound having an opposite phase is output, the sound cannot be canceled in the space. However, since sound pressure is equally applied to a cross section in the one-dimensional acoustic tube, one point of the cross section is captured to make a sound having an opposite phase to collide, thereby canceling the sound in the space. For example, the muffler of an automobile or the like can perform silencing by this scheme.

Fifth Example Embodiment

Figure 5B:
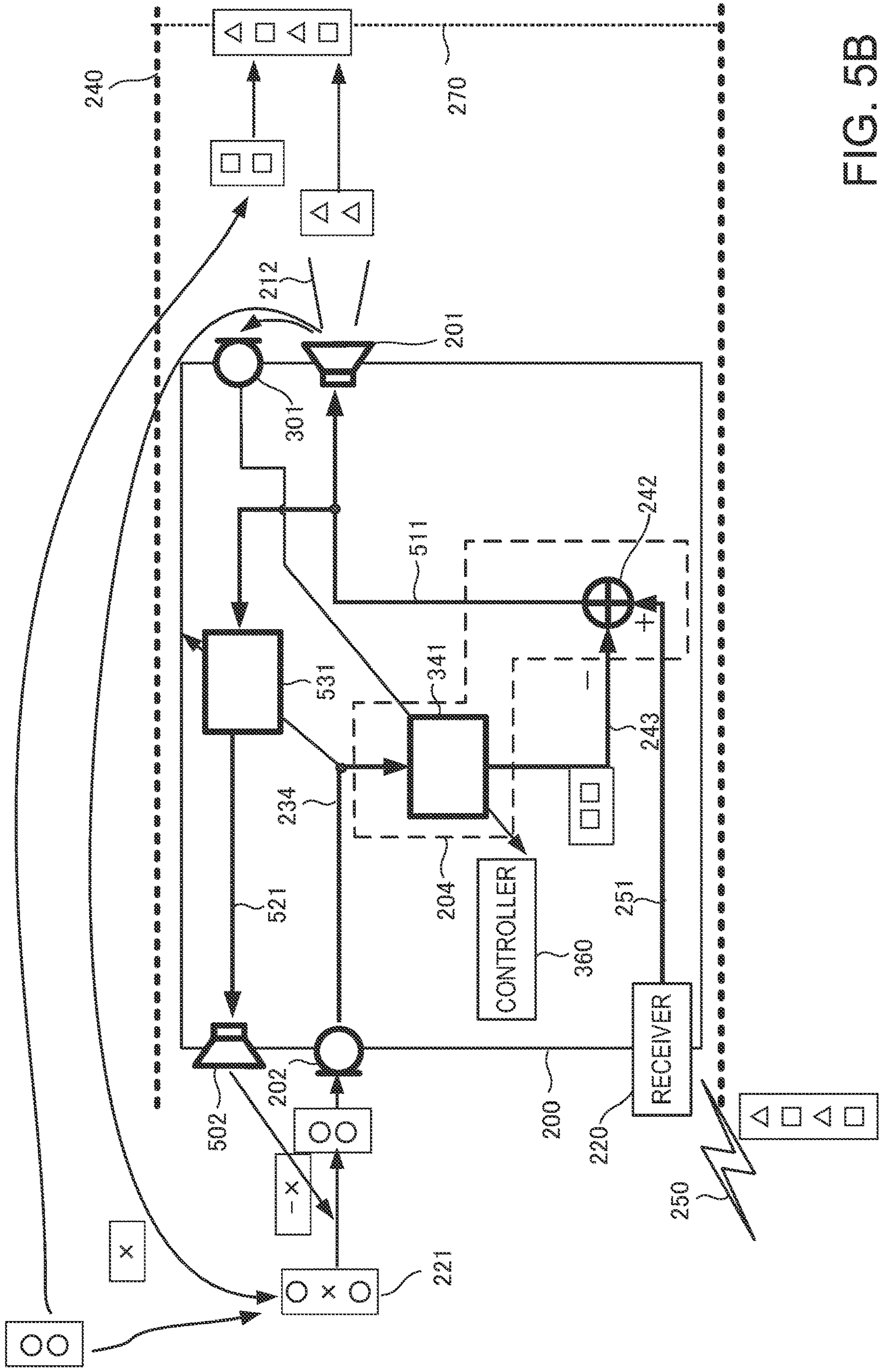
FIG. 5B is a view showing the arrangement of a voice output apparatus according to the fifth example embodiment of the disclosure.

A voice output apparatus according to the fifth example embodiment of the disclosure will be described next with reference to FIG. 5B. FIG. 5B is a view showing the arrangement of the voice output apparatus according to this example embodiment. The voice output apparatus according to this example embodiment is different from that according to the above-described fourth example embodiment in that an output voice signal input to a loudspeaker 201 is used for filter update of an adaptive filter 531. The remaining components and operations are similar to those in the fourth example embodiment. Hence, the same reference numerals denote similar components and operations, and a detailed description thereof will be omitted.

An output voice 212 captured by an internal microphone 301 and output from a loudspeaker 201 is used to update the filter coefficient of an adaptive filter 341. The adaptive filter 531 generates an opposite-phase voice signal 521 using an output voice signal 511 input to the loudspeaker 201. A loudspeaker 502 outputs an opposite-phase sound based on the opposite-phase voice signal 521.

The update amount of the adaptive filter 341 is large when the difference between a pseudo external noise signal 243 and the output voice 212 is sufficiently small. The update amount of an adaptive filter 231 is large when the output voice 212 output from the loudspeaker 201 is sufficiently large. A case in which the output voice 212 output from the loudspeaker 201 is sufficiently large corresponds to a case in which a transmission signal 250 is received.

According to this example embodiment, in addition to the above-described fourth example embodiment, the convergence of the adaptive filter 531 is fast and the adaptive filter 531 is also stable.

Sixth Example Embodiment

Figure 6:
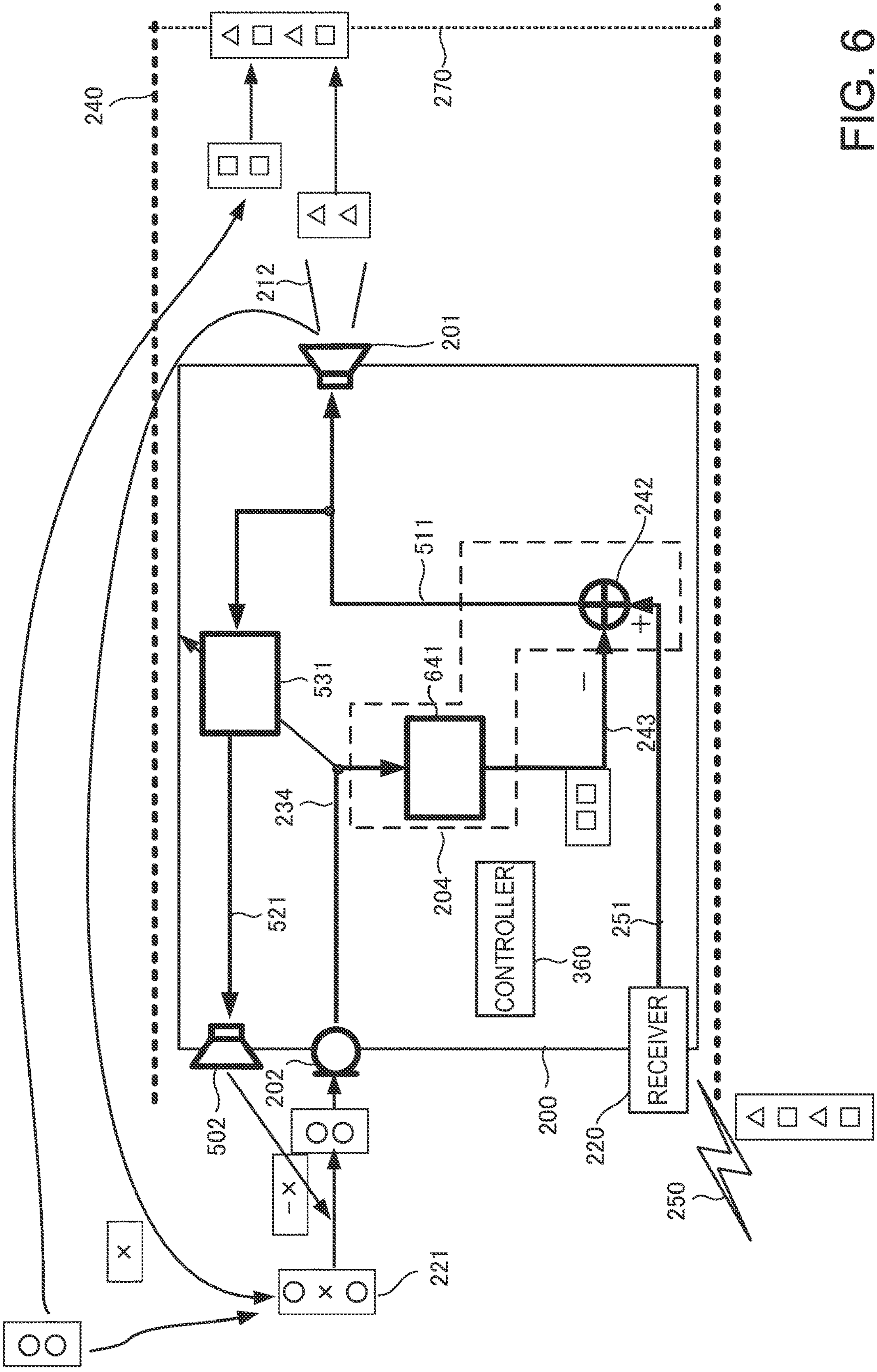
FIG. 6 is a view showing the arrangement of a voice output apparatus according to the sixth example embodiment of the disclosure.

A voice output apparatus according to the sixth example embodiment of the disclosure will be described next with reference to FIG. 6. FIG. 6 is a view showing the arrangement of the voice output apparatus according to this example embodiment. The voice output apparatus according to this example embodiment is different from that according to the above-described fifth example embodiment in that no internal microphone 301 is provided. The remaining components and operations are similar to those in the second example embodiment. Hence, the same reference numerals denote similar components and operations, and a detailed description thereof will be omitted.

An output voice signal 511 input to a loudspeaker 201 is used to update the filter coefficient of a fixed filter 641. Furthermore, an adaptive filter 531 generates an opposite-phase voice signal 521 of the output voice signal 511. A loudspeaker 502 outputs an opposite-phase sound ("−X") based on the opposite-phase voice signal 521.

According to this example embodiment, since the internal microphone is unnecessary, as compared to the fourth and fifth example embodiments, it is possible to improve, by a simple arrangement, the quality of a sound that arrives at the eardrum of the user. In addition, since the fixed filter 641 is used, no coefficient convergence time is required, thereby implementing stable sound quality.

Other Example Embodiments

While the disclosure has been particularly shown and described with reference to example embodiments thereof, the disclosure is not limited to these example embodiments. It will be understood by those of ordinary skill in the art that various changes in form and details may be made therein without departing from the spirit and scope of the disclosure as defined by the claims. A system or apparatus including any combination of the individual features included in the respective example embodiments may be incorporated in the scope of the disclosure.

The disclosure is applicable to a system including a plurality of devices or a single apparatus. The disclosure is also applicable even when an information processing program for implementing the functions of example embodiments is supplied to the system or apparatus directly or from a remote site. Hence, the disclosure also incorporates the program installed in a computer to implement the functions of the disclosure by the computer, a medium storing the program, and a WWW (World Wide Web) server that causes a user to download the program. Especially, the disclosure incorporates at least a non-transitory computer readable medium storing a program that causes a computer to execute processing steps included in the above-described example embodiments.

Figure 4A:
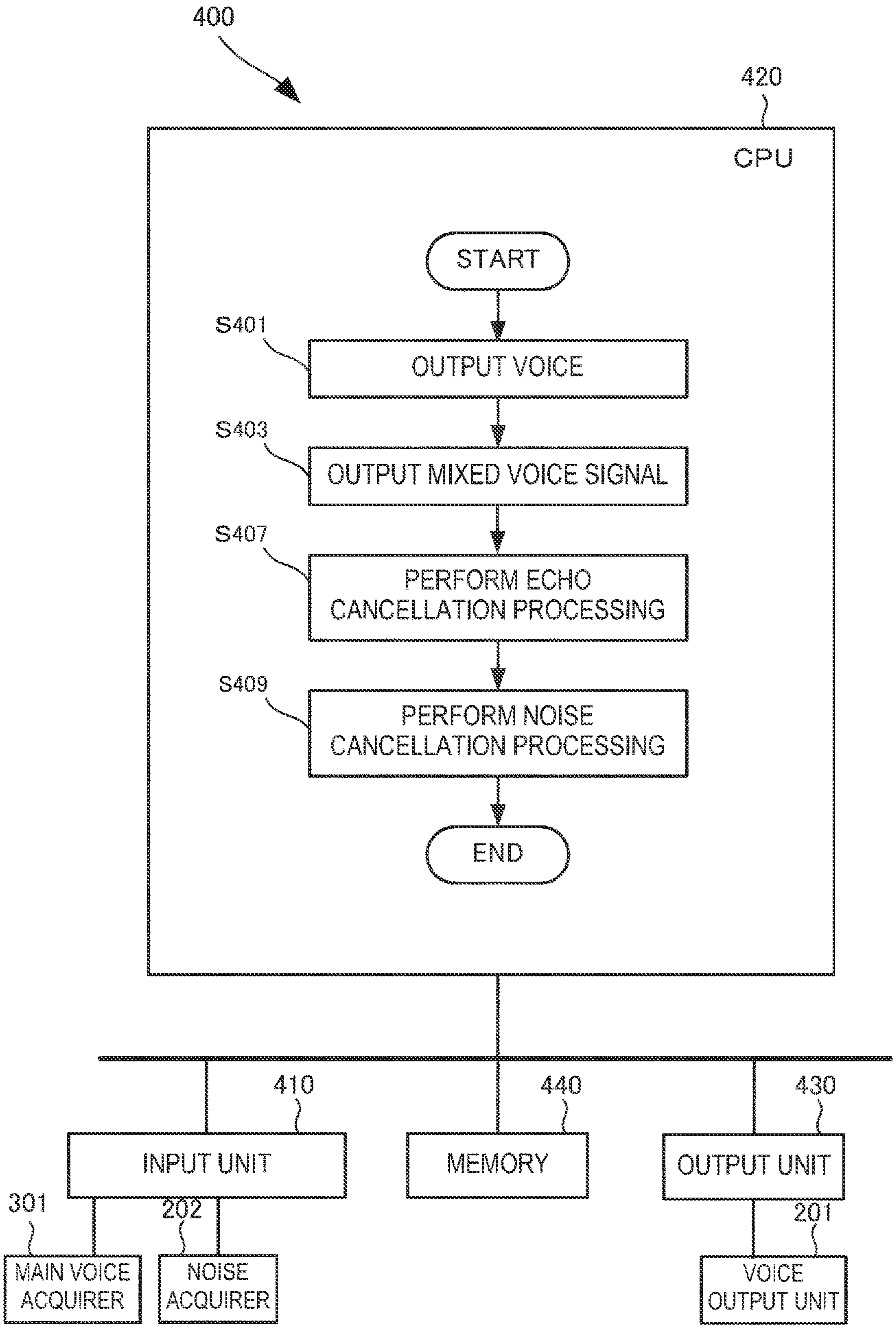
FIG. 4A is a block diagram showing the arrangement of a computer that executes a signal processing program when forming the third example embodiment by the signal processing program.

FIG. 4A is a block diagram showing the arrangement of a computer 400 that executes a signal processing program when forming the third example embodiment by the signal processing program. The computer 400 includes an input unit 410, a CPU (Central Processing Unit) 420, an output unit 430, and a memory 440.

The CPU 420 controls the operation of the computer 400 by loading the signal processing program stored in the memory 440. That is, after executing the signal processing program, the CPU 420 outputs, in step S401, an output voice 212 from the output unit 430. In step S403, the CPU 420 captures a mixed voice in which external noise 221 from the input unit 410 and the output voice 212 from a loudspeaker 201 are mixed, and outputs a mixed voice signal 222. In step S407, the CPU 420 performs echo cancellation processing for the mixed voice signal 222 using an output voice signal 211 input to the loudspeaker 201, generates a pseudo external noise signal 234, and outputs it. In step S409, the CPU 420 performs noise cancellation processing for an input voice signal 251 using the pseudo external noise signal 234.

Figure 4B:
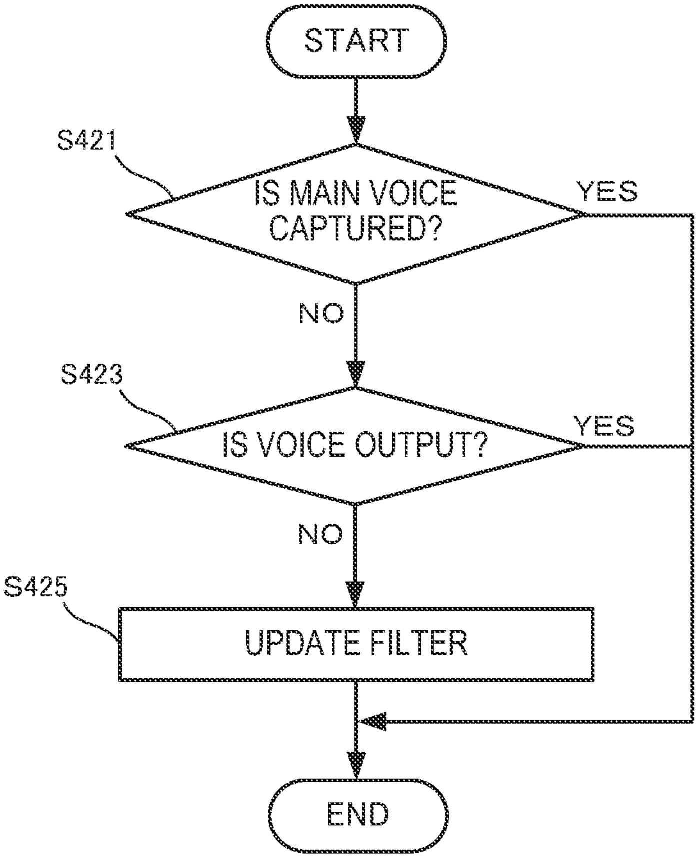
FIG. 4B is a flowchart illustrating the procedure of processing executed by a CPU 420.

FIG. 4B is a flowchart illustrating the procedure of processing executed by the CPU 420. In step S421, the CPU 420 determines whether an internal microphone 301 captures a main voice 311. If it is determined that the main voice 311 is acquired (YES in step S421), the CPU 420 ends the processing. If it is determined that the main voice 311 is not acquired (NO in step S421), the CPU 420 advances to step S423. In step S423, the CPU 420 determines whether the loudspeaker 201 outputs the output voice 212. If it is determined that the output voice 212 is output (YES in step S423), the CPU 420 ends the processing. If it is determined that the output voice 212 is not output (NO in step S423), the CPU 420 advances to step S425. In step S425, the CPU 420 updates an adaptive filter 341 of a noise canceler 204.

Figure 4C:
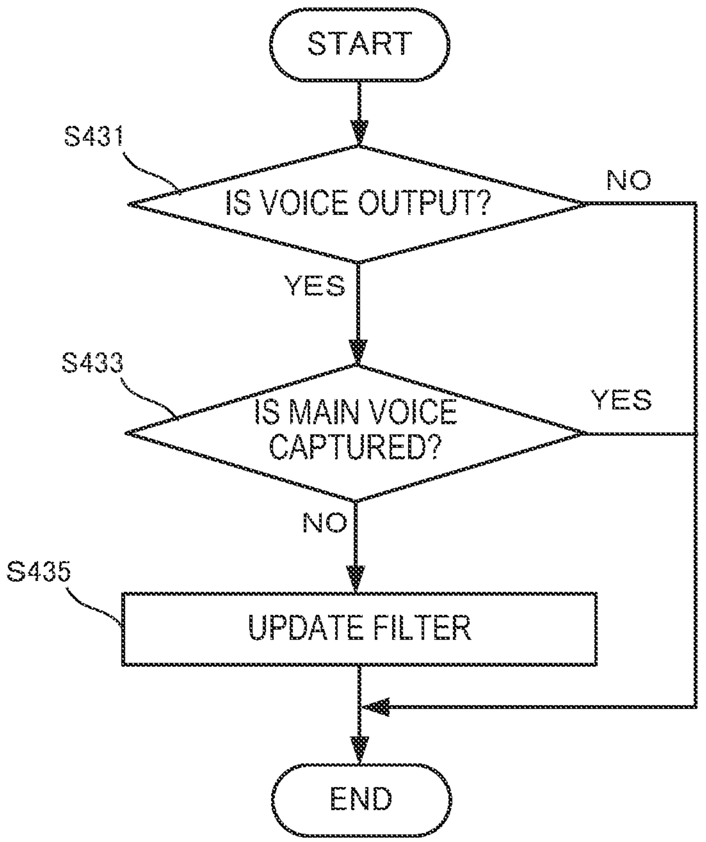
FIG. 4C is a flowchart illustrating the procedure of processing executed by the CPU 420.

FIG. 4C is a flowchart illustrating the procedure of processing executed by the CPU 420. In step S431, the CPU 420 determines whether the loudspeaker 201 outputs the output voice 212. If it is determined that the output voice 212 is not output (NO in step S431), the CPU 420 ends the processing. If it is determined that the output voice 212 is output (YES in step S431), the CPU 420 advances to step S433. In step S433, the CPU 420 determines whether the main voice 311 is captured. If it is determined that the main voice 311 is captured (YES in step S433), the CPU 420 ends the processing. If it is determined that the main voice 311 is not captured (NO in step S433), the CPU 420 advances to step S435. In step S435, the CPU 420 updates an adaptive filter 231 of an echo canceler 203.

Other Expressions of Example Embodiments

Some or all of the above-described example embodiments can also be described as in the following supplementary notes but are not limited to the followings.

(Supplementary Note 1)

There is provided a voice output apparatus comprising:

a first voice output unit that outputs a voice to an ear canal of a user based on an output voice signal;

a first noise acquirer that is arranged to face outward from a body of the user and captures a mixed voice including first external noise arriving from an outside of the user to output a mixed voice signal;

an echo canceler that cancels an influence, on the first external noise, of a leaked voice output from the first voice output unit and leaking to the outside of the user; and a noise canceler that generates a first external noise signal corresponding to the first external noise, and processes, using the first external noise signal, an input voice signal input from the outside to generate the output voice signal.

(Supplementary Note 2)

There is provided the voice output apparatus according to supplementary note 1, wherein the echo canceler processes the mixed voice signal using the output voice signal to generate a pseudo external noise signal, and the noise canceler processes the input voice signal using the pseudo external noise signal.

(Supplementary Note 3)

There is provided the voice output apparatus according to supplementary note 1 or 2, further comprising a second external noise acquirer that captures, as second external noise, part of the first external noise transmitted to the ear canal, wherein the noise canceler processes the input voice signal additionally using the second external noise.

(Supplementary Note 4)

There is provided the voice output apparatus according to supplementary note 3, wherein the second external noise acquirer further captures a main voice of the user transmitted through the ear canal from a vocal cord of the user to generate a main voice signal.

(Supplementary Note 5)

There is provided the voice output apparatus according to supplementary note 2 or 3, wherein the noise canceler performs noise cancellation processing using a first adaptive filter, and updates the first adaptive filter using a second external noise signal corresponding to the captured second external noise.

(Supplementary Note 6)

There is provided the voice output apparatus according to any one of supplementary notes 1 to 5, wherein the noise canceler performs noise cancellation processing using the first adaptive filter, the echo canceler performs echo cancellation processing using a second adaptive filter, the second adaptive filter is not updated when updating the first adaptive filter, and the first adaptive filter is not updated when updating the second adaptive filter.

(Supplementary Note 7)

There is provided the voice output apparatus according to supplementary note 3, wherein the noise canceler performs noise cancellation processing using a first adaptive filter, and updates the first adaptive filter at a timing when the second external noise acquirer acquires no second external noise and the voice output unit outputs no output voice.

(Supplementary Note 8)

There is provided the voice output apparatus according to supplementary note 6, wherein the echo canceler updates the second adaptive filter at a timing when the voice output unit outputs an output voice.

(Supplementary Note 9)

There is provided the voice output apparatus according to supplementary note 6 or 7, wherein the noise canceler and the echo canceler do not update the first adaptive filter and the second adaptive filter at a timing when the second external noise acquirer acquires the main voice.

(Supplementary Note 10)

There is provided the voice output apparatus according to any one of supplementary notes 1 to 9, wherein the echo canceler includes a voice signal generator that generates a voice signal of an opposite-phase voice having a phase opposite to a phase of a voice output from the voice output unit, and a second voice output unit that outputs the opposite-phase voice for canceling the leaked voice to the outside of the user based on the voice signal of the opposite-phase voice.

(Supplementary Note 11)

There is provided the voice output apparatus according to supplementary note 10, wherein the second external noise acquirer captures the voice output from the second voice output unit to the ear canal.

(Supplementary Note 12)

There is provided the voice output apparatus according to supplementary note 11, wherein the voice signal generator further includes an adaptive filter that generates the voice signal of the opposite-phase voice using an in-ear canal voice signal output from the second external noise acquirer.

(Supplementary Note 13)

There is provided the voice output apparatus according to any one of supplementary notes 10 to 12, wherein the noise canceler performs noise cancellation processing using the first adaptive filter, and the first adaptive filter updates a coefficient based on the in-ear canal voice signal.

(Supplementary Note 14)

There is provided a voice output method comprising:

outputting a voice to an ear canal of a user based on an output voice signal;

capturing a mixed voice including external noise arriving from an outside of the user to output a mixed voice signal;

canceling an influence, on the external noise, of a leaked voice output in the outputting and leaking to the outside of the user; and generating an external noise signal corresponding to the external noise, and processing, using the external noise signal, an input voice signal input from the outside to generate the output voice signal.

(Supplementary Note 15)

There is provided a voice output program for causing a computer to execute a method, comprising:

outputting a voice to an ear canal of a user based on an output voice signal;

arranging to face outward from a body of the user and capturing a mixed voice including external noise arriving from an outside of the user to output a mixed voice signal;

canceling an influence, on the external noise, of a leaked voice output in the outputting and leaking to the outside of the user; and generating an external noise signal corresponding to the external noise, and processing, using the external noise signal, an input voice signal input from the outside to generate the output voice signal.

What is claimed is:

1. A voice output apparatus comprising:

a first speaker that outputs voice to an ear canal of a user based on an output voice signal;

a first microphone that is arranged to face outward from a body of the user and that captures a mixed voice to output a mixed voice signal, the mixed voice including leaked voice output by the first speaker and leaking to outside the user and first external noise arriving from outside the user; and a processor that:

cancels influence, on the first external noise, of the leaked voice;

generates a first external noise signal corresponding to the first external noise; and processes, using the first external noise signal, an input voice signal input from outside the user to generate the output voice signal.

2. The voice output apparatus according to claim 1, wherein the processor performs noise cancellation processing using a first adaptive filter and performs echo cancellation processing using a second adaptive filter, the second adaptive filter not updated when the first adaptive filter is updated, and the first adaptive filter not updated when the second adaptive filter is updated.

3. The voice output apparatus according to claim 2, wherein the processor updates the second adaptive filter at a timing when the first speaker outputs the voice to the ear canal.

4. The voice output apparatus according to claim 1, wherein the processor processes the mixed voice signal using the output voice signal to generate a pseudo external noise signal, and the processor processes the input voice signal using the pseudo external noise signal.

5. The voice output apparatus according to claim 1, further comprising a second external microphone that captures, as second external noise, part of the first external noise transmitted to the ear canal, wherein the processor processes the input voice signal additionally using the second external noise.

6. The voice output apparatus according to claim 5, wherein the second external microphone further captures a main voice of the user transmitted through the ear canal from a vocal cord of the user to generate a main voice signal.

7. The voice output apparatus according to claim 5, wherein the processor performs noise cancellation processing using a first adaptive filter, and updates the first adaptive filter using a second external noise signal corresponding to the second external noise captured by the second external microphone.

8. The voice output apparatus according to claim 5, wherein the processor performs noise cancellation processing using a first adaptive filter, and updates the first adaptive filter at a timing when the second external microphone acquires no second external noise and the first speaker outputs no voice to the ear canal.

9. The voice output apparatus according to claim 6, wherein the processor does not update a first adaptive filter and a second adaptive filter at a timing when the second external microphone acquires the main voice.

10. The voice output apparatus according to claim 1, wherein the processor generates a voice signal of an opposite-phase voice having a phase opposite to a phase of the voice output by the first speaker, and the voice output apparatus further comprises a second speaker that outputs the opposite-phase voice for canceling the leaked voice to outside the user based on the voice signal of the opposite-phase voice.

11. The voice output apparatus according to claim 10, further comprising a second external microphone that captures the opposite-phase voice output by the second speaker to the ear canal, and outputs an in-ear canal voice signal.

12. The voice output apparatus according to claim 11, wherein the processor uses a first adaptive filter that generates the voice signal of the opposite-phase voice using the in-ear canal voice signal output by the second external microphone.

13. The voice output apparatus according to claim 1, wherein the processor performs noise cancellation processing using the first adaptive filter, and the first adaptive filter has a coefficient updated based on the in-ear canal voice signal.

14. A voice output method comprising:

outputting, by a speaker, voice to an ear canal of a user based on an output voice signal;

capturing, by a microphone arranged to face outward from a body of the user, a mixed voice to output a mixed voice signal, the mixed voice including leaked voice output by the first speaker and leaking to outside the user and first external noise arriving from outside the user;

canceling, by a processor, influence, on the external noise, of the leaked voice;

generating, by the processor, a first external noise signal corresponding to the first external noise; and processing, by the processor and using the first external noise signal, an input voice signal input from outside the user to generate the output voice signal.

15. A non-transitory computer readable medium storing a voice output program for causing a voice output apparatus to execute a method comprising:

outputting, by a speaker of the voice output apparatus, voice to an ear canal of a user based on an output voice signal;

capturing, by a microphone of the voice output apparatus and that is arranged to face outward from a body of the user, a mixed voice to output a mixed voice signal, the mixed voice including leaked voice output by the first speaker and leaking to outside the user and first external noise arriving from outside the user;

canceling, by a processor of the voice output apparatus, influence, on the external noise, of the leaked voice;

generating, by the processor, a first external noise signal corresponding to the first external noise; and processing, by the processor and using the first external noise signal, an input voice signal input from outside the user to generate the output voice signal.

* * * * *